US006742360B2

(12) United States Patent
Furui et al.

(10) Patent No.: US 6,742,360 B2
(45) Date of Patent: Jun. 1, 2004

(54) FRIT COATING METHOD, A FRIT COATING APPARATUS, A SEALING APPARATUS, AND A SEALING METHOD FOR A FLAT-TYPE CATHODE-RAY TUBE

(75) Inventors: Koichi Furui, Kanagawa (JP); Jun Miura, Fukushima (JP)

(73) Assignee: Sony Corporation (JP)

(*) Notice: Subject to any disclaimer, the term of this patent is extended or adjusted under 35 U.S.C. 154(b) by 296 days.

(21) Appl. No.: 09/892,668

(22) Filed: Jun. 28, 2001

(65) Prior Publication Data

US 2002/0116949 A1 Aug. 29, 2002

(30) Foreign Application Priority Data

Feb. 26, 2001 (JP) .................................... P2001-050878
Feb. 26, 2001 (JP) .................................... P2001-050880

(51) Int. Cl.[7] ................................................ C03C 27/00

(52) U.S. Cl. ............................ 65/43; 65/60.8; 427/269; 427/428

(58) Field of Search ............................ 65/60.8, 111, 43, 65/36, 33.6, 155, 152; 427/68, 162, 163.3, 163.1, 211, 269, 428, 443.2; 118/258

(56) References Cited

U.S. PATENT DOCUMENTS 3,607,180 A * 9/1971 Merz et al. .................. 65/33.4

FOREIGN PATENT DOCUMENTS

| | | | |
|---|---|---|---|
| JP | 11-96948 | * | 4/1999 |
| JP | 11-096948 | | 4/1999 |

* cited by examiner

*Primary Examiner*—Sean Vincent
(74) *Attorney, Agent, or Firm*—Rader, Fishman & Grauer PLLC; Ronald P. Kananen

(57) ABSTRACT

In a sealing apparatus used in a process for sealing a glass tube-assembly of a flat-type cathode-ray tube by frits, three of a front panel, a screen panel and a funnel can be sealed together, and the front panel can be prevented from being broken. The sealing apparatus includes a frame for properly positioning a combined assembly in which the front panel, the screen panel and the funnel are butted with each other by frits and the following sealing jig (41). The sealing jig (41) includes a holding means (42) for holding a front panel (2) and a screen panel (3) under the condition that joint surfaces of the front panel and the screen panel are butted with each other by frits. The holding means (42) is provided with a first resilient member (43) which is urged against the outer surface of the front panel (2) and a second resilient member (42) which is urged against the outer surface of the screen panel (3). A portion in which the first resilient member (43) is urged against the outer surface of the front panel (2) is provided with a member (45) whose hardness is selected to be less than that of a panel glass

6 Claims, 16 Drawing Sheets

30

PRIOR ART

PRIOR ART

PRIOR ART

FRIT COATING METHOD, A FRIT COATING APPARATUS, A SEALING APPARATUS, AND A SEALING METHOD FOR A FLAT-TYPE CATHODE-RAY TUBE

BACKGROUND OF THE INVENTION

1. Field of the Invention

The present invention relates to a sealing apparatus and a sealing method for a flat-type cathode-ray tube and more specifically to a frit coating method and a frit coating apparatus suitable for coating frits on an object to be coated such as glass tube-assembly parts thereof.

2. Description of the Related Art

There is known a reflection type or a transmission type flat cathode-ray tube. The reflection type flat cathode-ray tube, for example, is known in that a manufacturing cost thereof is low and a picture quality thereof is excellent. As shown in FIG. 15 (perspective view), FIG. 16 cross-sectional view) and FIG. 17 (exploded perspective view of a glass tube-assembly), a flat-type cathode-ray tube 1 of this kind has a flat type glass tube-assembly 6 comprised of three members, a first panel, in this example, a front panel 2, a second panel with a fluorescent screen 5 formed thereon, in this example, a screen panel 3, and a funnel 4, which is made by end-sealing an electron gun 8 into a neck portion 7 of the funnel 4.

The front panel 2 is formed of a flat plate-like glass plate, for example. The screen panel 3 includes a curved-surface rising portion, i.e., so-called skirt portion 3*a* formed along three sides except the joint side of the funnel 4. The funnel 4 is formed like a funnel shape having a large-diameter opening portion at the joint end faces of the two panels 2, 3 and the neck portion 7 joined to the rear portion thereof.

The flat type glass tube-assembly 6 is constructed in such a manner that faces between the front panel 2 and the screen panel 3 are coated with frits by a dispenser, the two panels 2, 3 are fixed by a jig, a joint end face 4A of the funnel 4 is coated with frits, the two panels 2, 3 and the funnel 4 are fixed by a sealing apparatus and are integrally joined by fritting within a furnace.

Heretofore, frits had been coated on the funnel 4 by a dispenser or a roller. However, when frits are coated on the funnel by a roller, an amount of frits adhering to the roller becomes unstable, and there is then a problem that the amount of frits coated on the funnel 4 does not become stable.

In view of the aforesaid aspect, it is an object of the present invention to provide a frit coating method and a frit coating apparatus in which frits can be coated satisfactorily on an object to be coated by stabilizing the amount of frits coated on the object, a coating process can be made efficient and a quality of a product can be stabilized.

Further, as described above, since a flat-type glass tube-assembly 6 of a flat-type cathode-ray tube is comprised of the three members, when this flat-type glass tube-assembly 6 is assembled, first, the front panel 2 and the screen panel 3 are bonded together by frits and then combined with the funnel 4. Accordingly, the front panel 2 and the screen panel 3 need to be temporarily supported in order to butt the front panel 2 and the screen panel 3, which had been butted by frits, with the funnel 4.

However, in a conventional jig for temporarily supporting the front panel 2 and the screen panel 3, i.e., so-called sealing jig, a plate spring attached to an annular holding member is directly urged against the front panel 2 and the screen panel 3. At that time, in the screen panel 3, since the plate spring is brought in contact with a curved portion having a large curved angle, there does not arise any problem. However, since the plate springs of the edge portions at both sides are brought in contact with the flat plate-like front panel 2, there is then a risk that the front panel will be damaged or cracked.

Specifically, the edge portion of the flat plate-like front panel is chamfered. When the metal plate spring is directly urged against the edge portion of the chamfered front panel to thereby hold the front panel and the screen panel, the chamfered portion is damaged by scratches such as micro-cracks. When the front panel is sintered by frits within a furnace, a stress occurs in the front panel and the micro-crack grows to become a large crack so that the front panel will be broken. There is then a problem that the front panel cannot be sintered by frits safely.

In view of the aforesaid aspect, it is another object of the present invention to provide a sealing apparatus for a flat-type cathode-ray tube in which glass tube-assembly parts can be prevented from being damaged and a flat-type glass tube-assembly can be sintered together, a sealing jig for such sealing apparatus and a sealing method.

SUMMARY OF THE INVENTION

In a frit coating method according to the present invention, frits supplied from a frit supply means are coated on a predetermined portion of an object to be coated by a roller-type coating means.

According to the frit coating method of the present invention, frits are coated by the roller-type coating means, thereby the amount of frits supplied to the roller-type coating means is stabilized, the amount of frits coated on the object to be coated is stabilized and frits can be coated satisfactorily.

A frit coating apparatus according to the present invention comprises a frit supply means for supplying frits, a roller-type coating means for supplying frits to an object to be coated and a moving means for moving the object to be coated in a close relation to the roller-type coating means.

Since the frit coating apparatus according to the present invention has the arrangement in which the object to be coated is moved by the moving means in a close relation to the roller-type coating means to which frits had been supplied, the amount of frits coated on the object to be coated can be made stable and thereby frits can satisfactorily be coated on the object to be coated.

A sealing jig according to the present invention includes a holding means for holding a front panel and a screen panel by frits such that joint surfaces of the front panel and the screen panel are butted with each other, wherein the holding means is provided with a first resilient member which is urged against the outer surface of the front panel and a second resilient member which is urged against the outer surface of the screen panel, and a portion in which the first resilient member comes in contact with the front panel is formed of a member whose hardness is selected to be less than that of the front panel.

In the sealing jig according to the present invention, since the holding means holds the combined assembly in which the front panel and the screen panel are butted with each other by urging the first resilient member and the second resilient member against the outer surfaces of the front panel and the screen panel, respectively, the front panel and the screen panel can reliably be held without positional displacement. In addition, since the portion in which the first resilient member is urged against the outer surface of the front panel is comprised of the member whose hardness is selected to be less than that of the front panel, the front panel can be protected from being damaged by the member, and the occurrence of cracks and the like can be prevented when the glass tube-assembly is sintered by frits.

A sealing apparatus according to the present invention is comprised of a frame for properly positioning a combined assembly in which a front panel, a screen panel and a funnel are butted with each other by frits and the above sealing jig.

Since the sealing apparatus according to the present invention includes the frame for properly positioning the combined assembly in which the front panel, the screen panel and the funnel are butted with each other by frits and the above sealing jig, the three of the front panel, the screen panel and the funnel can be sealed together. In addition, since the sealing apparatus includes the above sealing jig, the front panel can be protected from being damaged and the occurrence of cracks and the like can be prevented when the glass tube-assembly is sintered by frits. Then, it becomes possible to sinter the glass tube-assembly by frits safely.

A sealing method according to the present invention comprises the steps of butting joint surfaces of a front panel, a screen panel and a funnel and holding and sealing the front panel, the screen panel and the funnel under the condition that an angle between a plane of the front panel and a horizontal plane becomes an acute angle.

In the sealing method according to the present invention, since the front panel, the screen panel and the funnel are held and sealed under the condition that the angle between the plane of the front panel and the horizontal plane becomes the acute angle, when fused frits are caused to flow by a gravitation, such fused frits are stored in a three-point joint portion in which the front panel, the screen panel and the funnel are collected, and hence the front panel, the screen panel and the funnel can reliably be sealed by frits. Therefore, the air leakage at the three-point joint portion can be prevented reliably.

DESCRIPTION OF THE PREFERRED EMBODIMENTS

Figure 1:
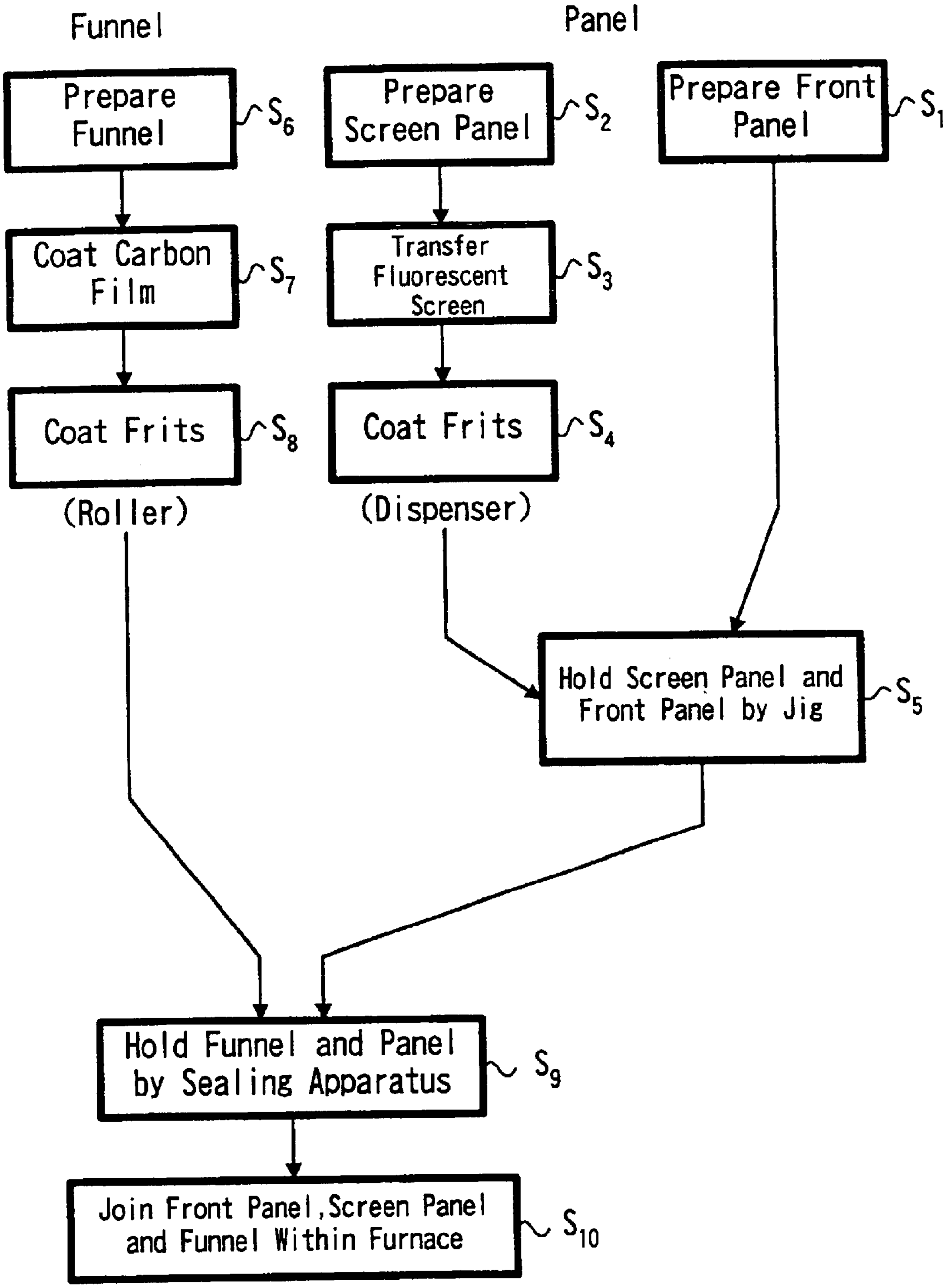
FIG. 1 is a flowchart to which reference will be made in explaining a frit sealing process of a glass tube-assembly of a flat-type cathode-ray tube according to an embodiment of the present invention.

Embodiments according to the present invention will be described below with reference to the drawings.

In these embodiments the case in which the present invention is applied to the process for sealing the flat-type glass tube-assembly 6 in the aforementioned flat-type cathode-ray tube 1 by frits will be described.

Similarly as described before, the flat-type glass tube-assembly 6 is comprised of three members of a first panel, in this embodiment, a flat plate-like front panel 2, a second panel, in this embodiment, a screen panel 3 having a curved surface and which has a shape in which a rising portion, i.e., a so-called skirt portion 3*a* is formed along three sides and a funnel 4 including a neck portion 7.

FIG. 1 shows a flowchart of a frit sealing process of this flat-type glass tube-assembly 6. There are prepared a front panel 2, a screen panel 3 and a funnel 4. In the screen panel 3 prepared at a step $S_2$, a fluorescent screen 5 is formed on the inner surface at a step $S_3$. The fluorescent screen 6 can be formed by, e.g., a transfer methods. In the case of a reflection type, for example, the fluorescent screen 6 can be formed by using a transfer foil in which an electrode layer formed of a transparent conductive film (e.g., ITO film), a reflection layer, a fluorescent layer and an adhesive layer are sequentially laminated on a base film which was treated by releasing treatment.

Next, at a step $S_4$, frit (so-called frit glass) is coated on the joint end face between the screen panel 3 and the front panel 2, i.e., a joint end face 3B of a skirt portion 3*a* by a dispenser, for examples. The screen panel 3 with the frit coated thereon and the front panel 2, which had been prepared at the step $S_1$, are held at a step $S_5$ by a sealing jig (so-called panel presser jig), which will be described later on, under the condition that their joint surfaces are butted with each other.

On the other hand, at a step $S_7$, a carbon film which serves as an internal conductive film is coated on the inner surface of the funnel 4 which had been prepared at a step $S_6$. Then, at a step $S_8$, frits are coated on the joint end face 4A in which the funnel 4 and the two panels 2, 3 are joined by a frit coating apparatus which will be described later on. The frits are coated on the joint end face by a roller-type coating means.

Next, the funnel 4 with the frits coated thereon and the two panels 2, 3 held by the sealing jig are held by a sealing apparatus, which will be described later on, at a step $S_9$ under the condition that their joint surfaces are butted with each other. Then, this sealing apparatus is inserted into a predetermined heating furnace, in which frits are fused and crystallized to integrally join the front panel 2, the screen panel 3 and the funnel 4, thereby resulting in the flat-type glass tube-assembly 6 being manufactured.

While frits were coated on the screen panel 3 by using the dispenser in the above embodiment, the present invention is not limited thereto, and frits may be coated on the screen panel by using a roller-type coating means. Moreover, when frits are coated on the front panel side, there can be applied the roller-type coating means.

In this embodiment, frits are coated on the joint end face 4A of the funnel 4 by using a roller-type coating means whose frit supply surface is formed as a concave and convex surface. Frits are supplied to the concave and convex surface of this roller-type coating means, and the frits are coated on the joint end face 4A of the funnel 4 by moving the funnel 4 in a close relation to the concave and convex surface to which the frits had been supplied. At that time, the amount of supplied frits is regulated by controlling the amount of the frits supplied to the concave and convex surface of the roller-type coating means with a supply amount control means so that frits of a predetermined amount may uniformly be coated on the joint end face 4A of the funnel 4.

Figure 2:
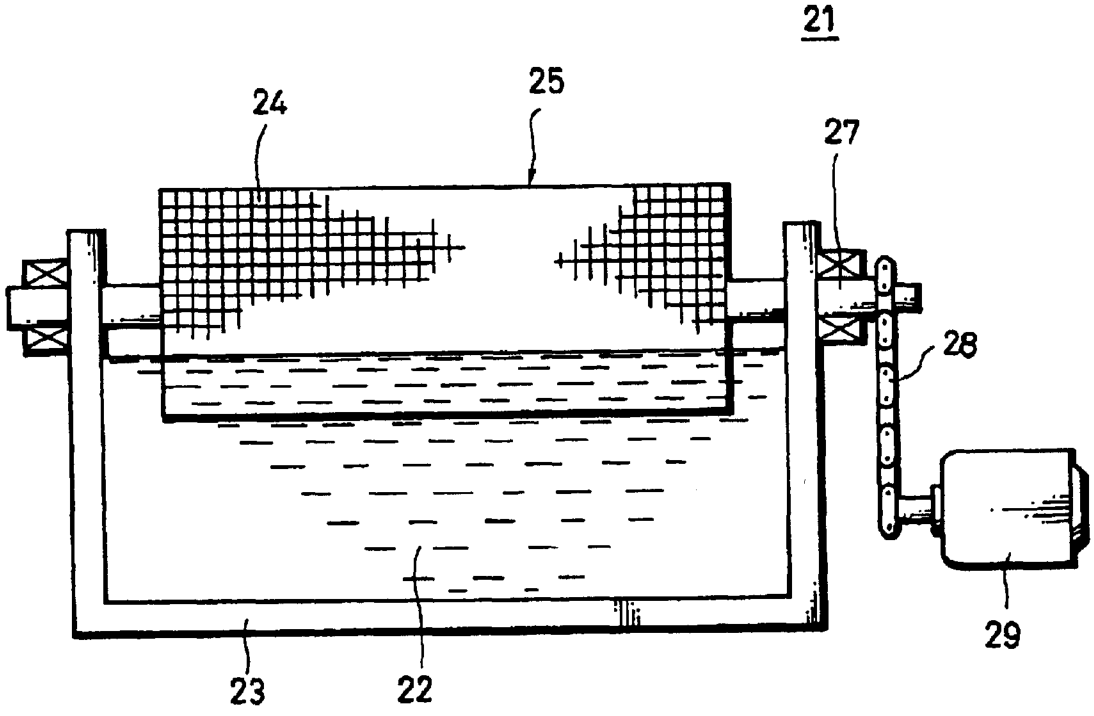
FIG. 2 is a schematic diagram showing a frit coating apparatus according to an embodiment of the present invention.
Figure 3:
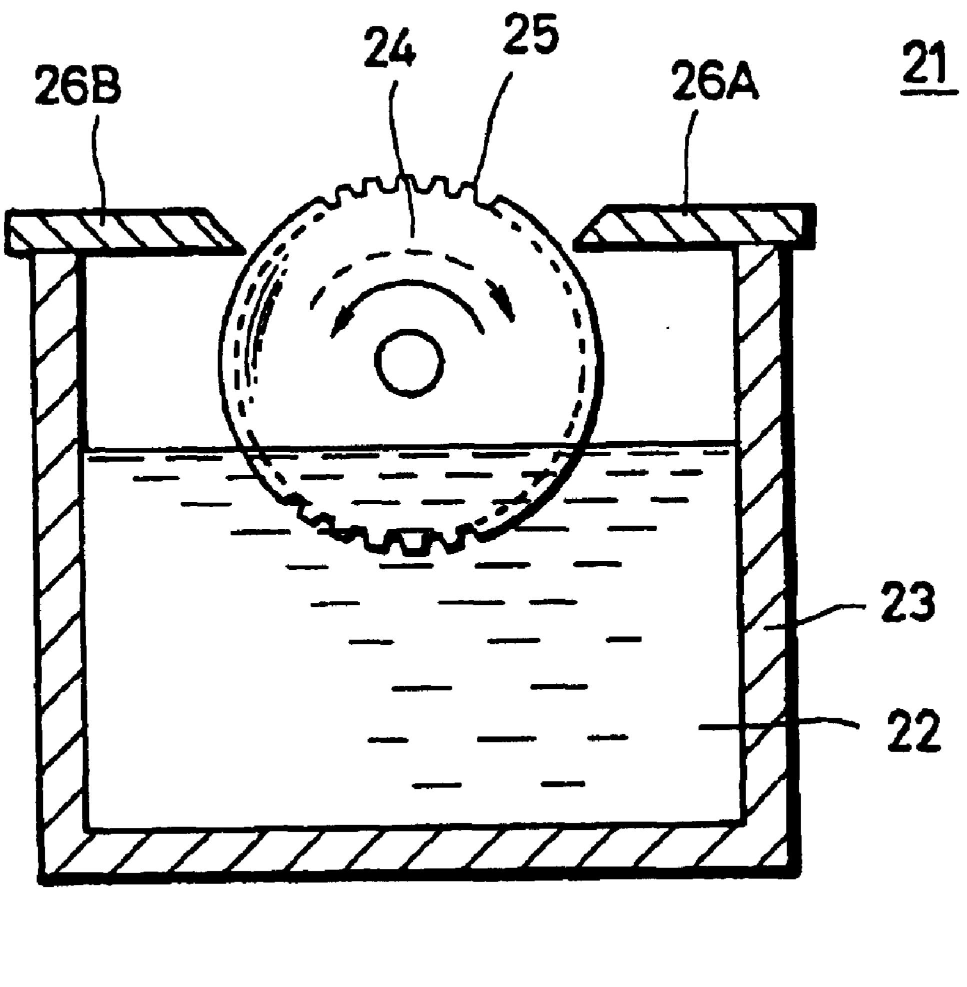
FIG. 3 is a cross-sectional view of the frit coating apparatus shown in FIG. 2.
Figure 4:
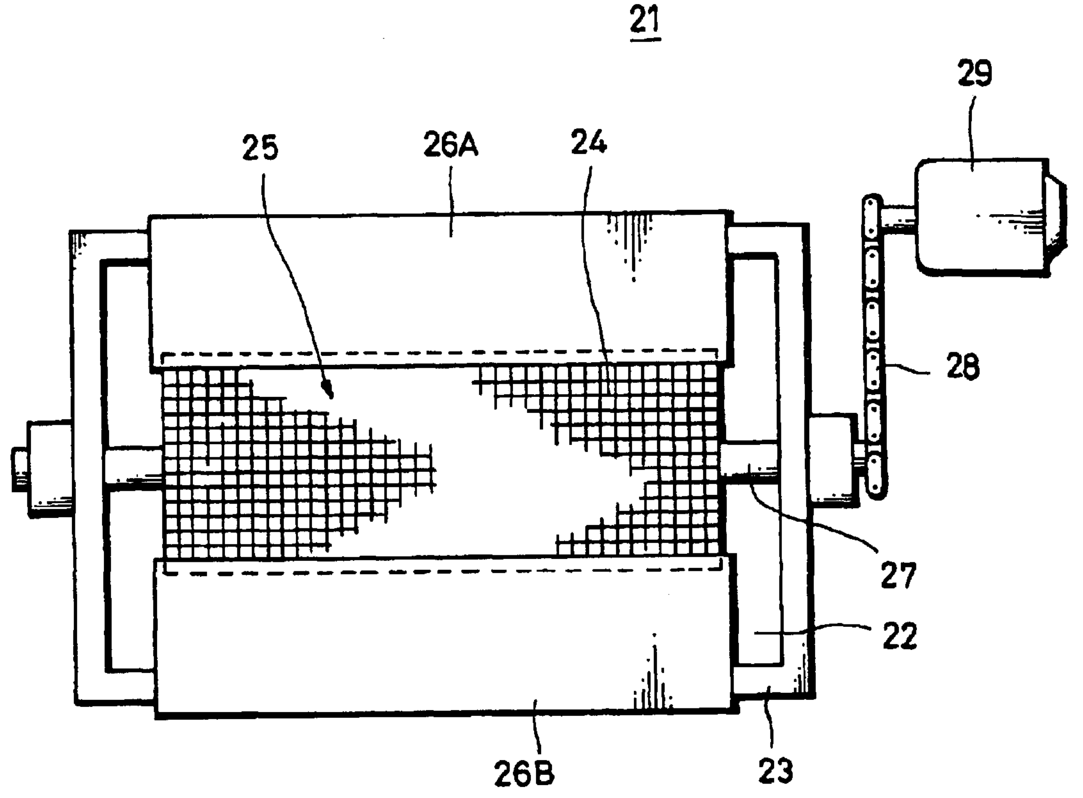
FIG. 4 is a top view of the frit coating apparatus shown in FIG. 2.

FIGS. 2 to 4 show a frit coating apparatus according to an embodiment of the present invention.

A frit coating apparatus 21 according to this embodiment is comprised of a frit supply means for supplying frits, in this embodiment, a frit tank 23 which stores frits 22, an object to be coated, in this embodiment, a roller-type coating means for directly coating frits on the joint end face 4A of the funnel 4, in this embodiment, a coating roller 24, a supply amount control means for controlling an amount of the frits 22 supplied to a frit supply surface 25 of this coating roller 24, in this embodiment, drawing plates 26 [26A, 26B] and a moving means (not shown) for moving the funnel 4 such that the funnel may move over the coating roller 24 in the vicinity of the concave and convex surface 25 of the coating roller 24 under the condition that its joint end face 4A is directed in the lower direction.

The coating roller 24 is rotatably disposed in such a manner that a part of the frit supply surface 25 may exist within the frits 22 in the frit tank 23. The frit supply surface 25 is formed on the concave and convex surface having checker-like grooves formed thereon A rotary shaft 27 of the coating roller 24 is coupled to a drive motor 29 through a power transmission means, e.g., a chain 28 or the like. Accordingly, the drive motor 29 rotates the coating roller 24 to permit the frits 22 within the frit tank 23 to be supplied to the frit supply surfaces i.e., the concave and convex surface 25 Since the frit supply surface is formed as the concave and convex surface 25, the frits 22 can stably be moved upwardly to the surface 25 of the coating roller 24.

The drawing plates 26 [26A, 26B] are provided at the symmetrical positions across the coating roller 24. One drawing plate 26A is used to supply the frits 22 of a predetermined amount to the concave and convex surface 25 of the coating roller 24 when the frits are coated. This drawing plate is disposed in such a manner that its tip end is closely opposed to the concave and convex surface of the coating roller 24, i.e., the concave and convex surface 25 of the portion exposed from the frits 22 of the frit tank 23 with a predetermined space which regulates the frit supply amount. When the funnel 4 which is the object to be coated is moved in the opposite direction, the coating roller 24 is rotated in the opposite direction. At that time, the amount of frits supplied to the concave and convex surface 25 is regulated by the other drawing plate 26B.

Although not shown, the moving means is constructed such that the funnel 4 can be moved with its tube-axis direction in the vertical direction in such a manner that its joint end face 4A is directed toward the coatings roller 24, i.e., the funnel can be moved from right to left in FIG. 3, for example.

Figure 5:
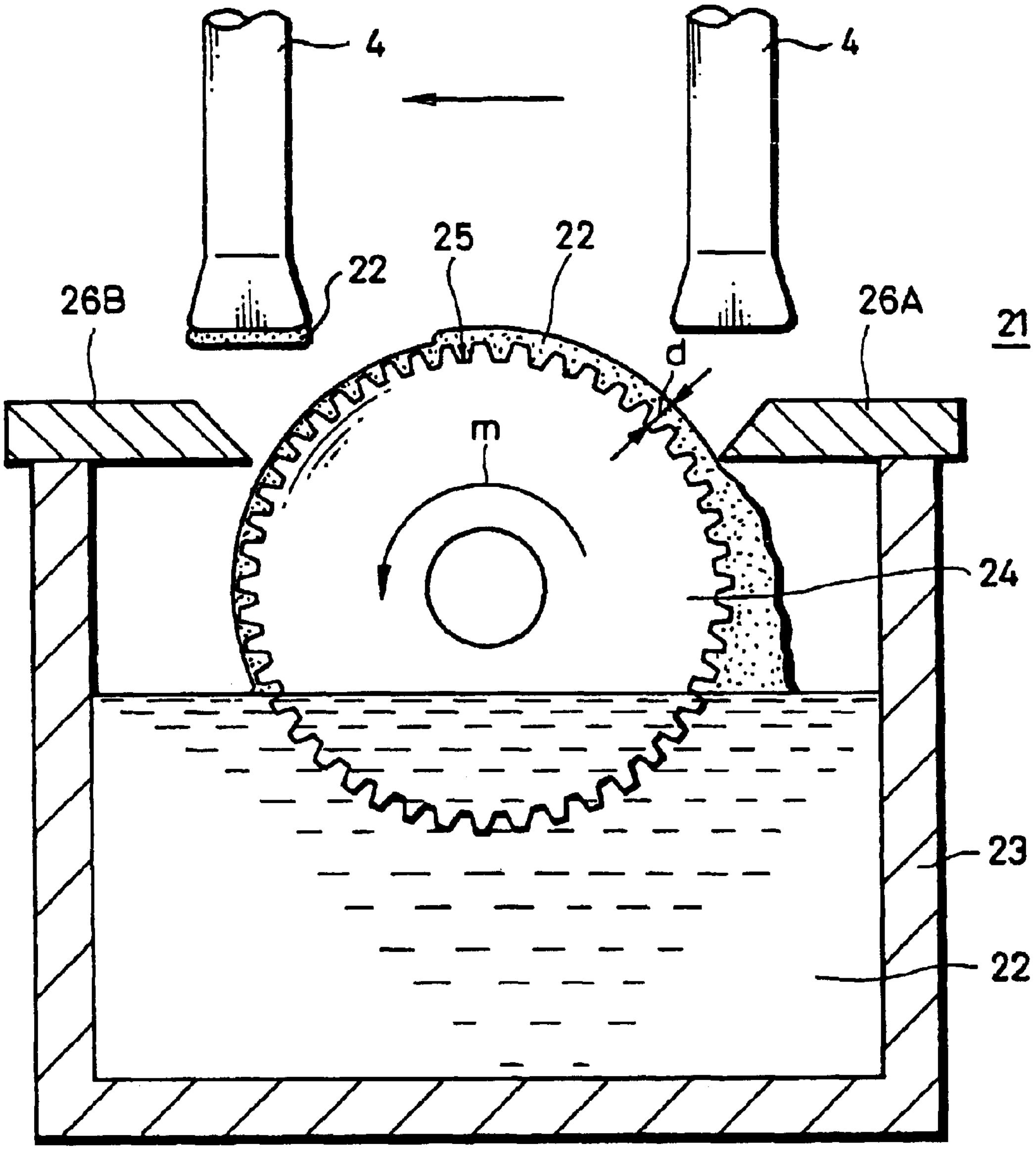
FIG. 5 is a diagram to which reference will be made in explaining an operation of the frit coating apparatus shown in FIG. 2.

FIG. 5 shows operations of this frit coating apparatus 21.

When frits are coated, the coating roller 24 is rotated in the counter-clockwise direction m in the sheet of drawing by the drive motor 29. As a consequence, the frits 22 within the frit tank 23 are moved upward while being supplied to the concave and convex surface 25 of the coating roller 24. Then, the frits 22 are drawn by the upper drawing plate 26A so as to establish a predetermined supply thickness d, and hence the frits 22 of the predetermined amount are supplied to the coating roller 24 in such a manner that the frits with a uniform thickness may be supplied. Relative to this rotating coating roller 24, the funnel 4 is moved over the coating roller 24 by the moving means in such a manner that its joint end face 4A is directed in the lower direction while it is being placed in the vertical direction. When the funnel is moved over the coating roller, the frits 22 are uniformly coated on the joint end face 4A of the funnel 4.

According to the frit coating method using the frit coating apparatus 21 of this embodiment, since the frit supply surface 25 of the coating roller 24 is formed as the concave and convex surface, the frit 22 is stored in the concave portions of the concave and convex surface 25 which is the frit supply surface, and the frit 22 can stably be supplied to the frit supply surface 25. In addition, by the drawing plate 26A or 26B, the amount of frits supplied to the frit supply surface 25 is regulated as the predetermined amount and the frit 22 can be uniformly supplied to the whole surface of the supply surface 25. Then, since the joint end face 4A of the funnel 4 is made close to the coating roller 24 as much as possible and moved over the coating roller so that the frit 22 is coated on the joint end face 4A, the frit 22 of the predetermined amount can be coated onto the joint end face 4A of the funnel 4 stably and uniformly. Specifically, the frit can stably and uniformly be coated over the whole area including the corner portions of the joint end face 4A of the funnel 4 (without portions with which frits are not coated). As a result, the funnel 4 and the two panels 2, 3 can be joined together completely by frits, and hence a leakage of air in which air flows from the outside of the glass tube-assembly to the inside of the tube-assembly (so-called air leak) can be prevented completely. Moreover, the coated amount of the frits can be made stable and uniform and the above frits can be coated also on each funnel 4. Accordingly, the frit 22 can satisfactorily be coated on the funnel 4 and the frit coating process can be made efficient. Finally, it is possible to stabilize the quality of the product of the flat-type cathode-ray tube.

While the frits were coated on the funnel 4 as described above, the present invention is not limited thereto, and the frit coating method according to this embodiment can be applied to a process for coating frits on the screen panel 3 and the front panel 2.

Figure 6:
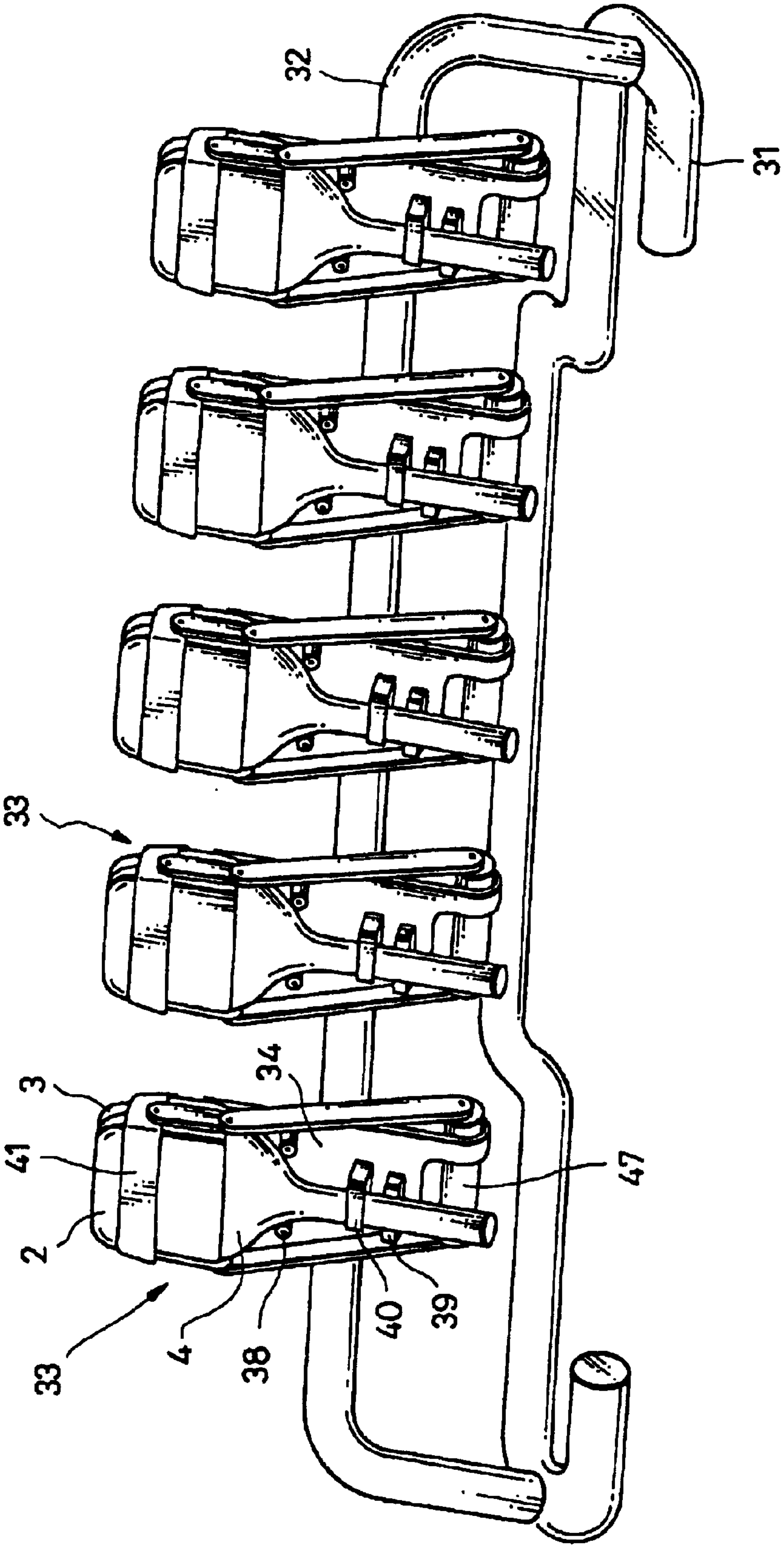
FIG. 6 is a perspective view showing an sealing apparatus according to an embodiment of the present invention.
Figure 7:
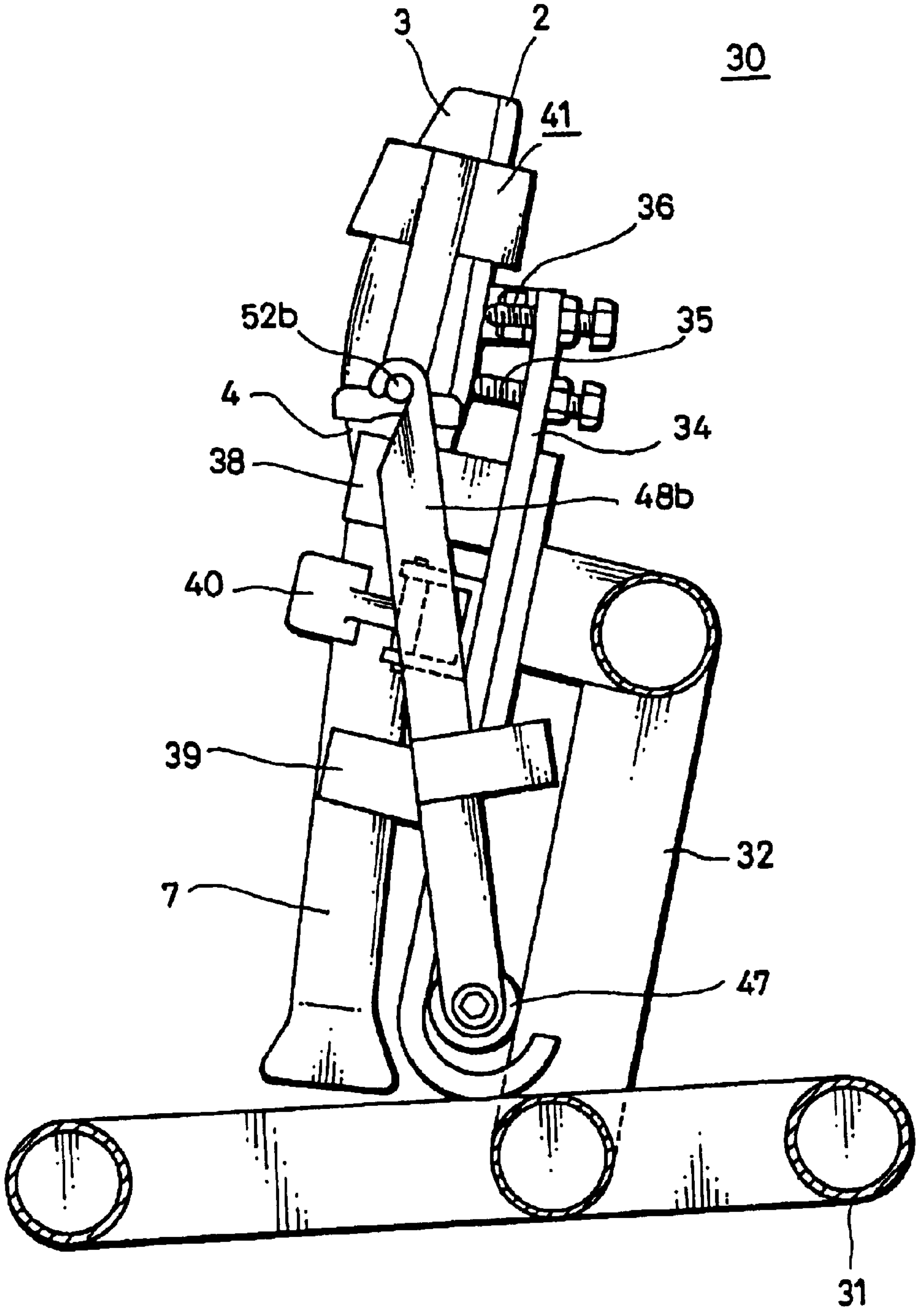
FIG. 7 is a side view showing an sealing apparatus according to an embodiment of the present invention.

FIGS. 6 and 7 show a frit sealing method and a sealing apparatus used in such a frit sealing method according to an embodiment of the present invention.

As shown in FIG. 6, a sealing apparatus 30 according to this embodiment is comprised of a common U-shaped arm

32 attached to a common base 31 and a plurality of sealing frames 33 disposed in parallel to each other for properly positioning the aforementioned front panel 2, the screen panel 3 and the funnel 4 with the frits coated thereon on the horizontal portion of the arm 32 in such a manner that respective members are formed of heat-resistance members.

As shown in FIG. 7, in the sealing frame 33, a back fixing plate 34 is attached to the arm 32. To this back fixing plate 34, there are attached a first butting means 35 formed of an adjustment screw, for example, for setting the position of the funnel when it is butted with the outer surface of the funnel 4, a second butting means 36 formed of an adjustment screw, for example, for setting the position of the flat plate-like front panel 2 when it is butted with the front panel, a receiving portion 38 for sandwiching and receiving the neck portion 7, a contact portion 39 which comes in contact with the circumferential surface of the neck portion 7 and an engagement portion 40 for engaging the funnel 4 with the back fixing plate.

Figure 8:
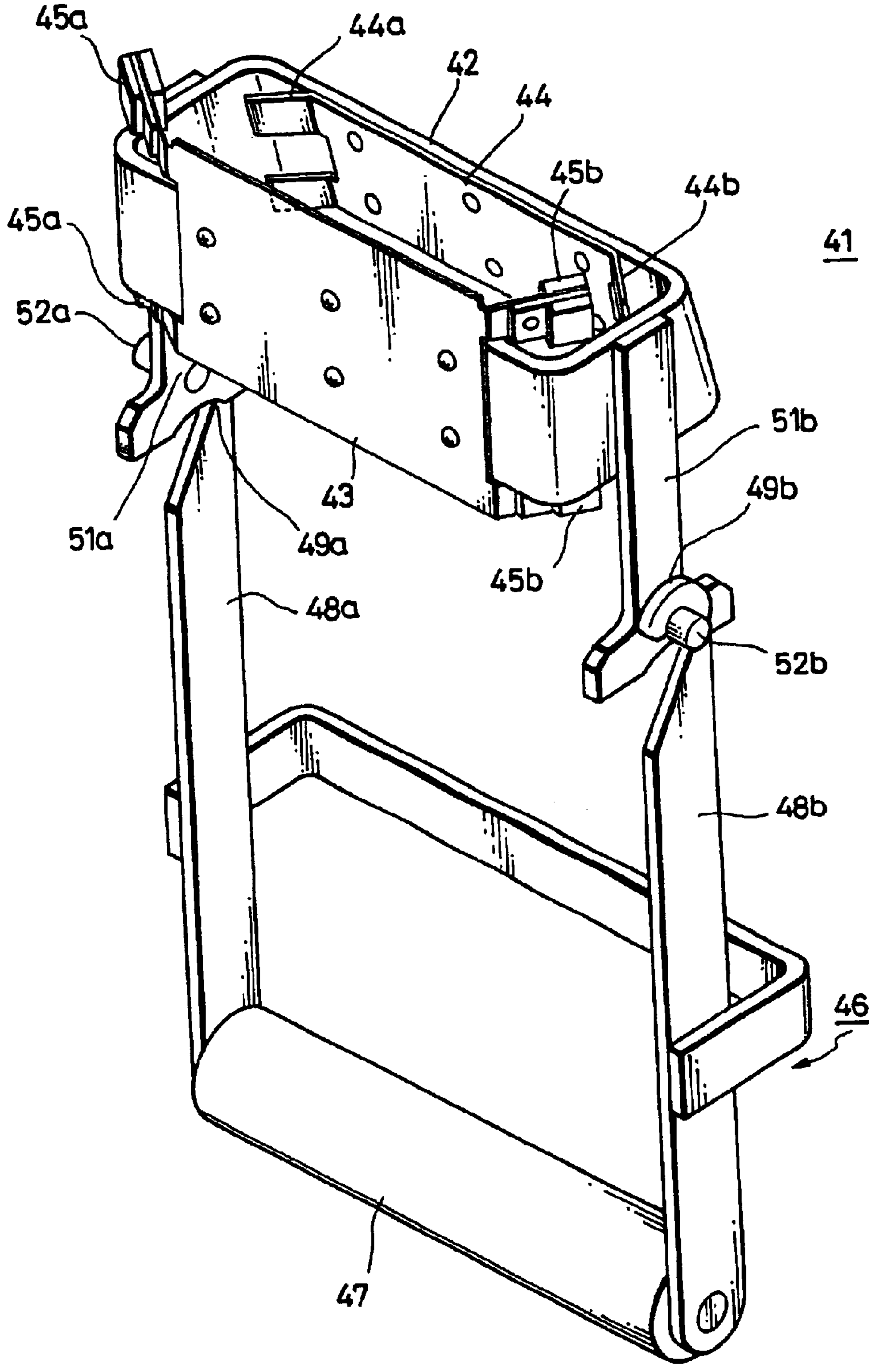
FIG. 8 is a perspective view showing an sealing jig according to an embodiment of the present invention.

On the other hand, there is provided a sealing jig for holding the front panel 2 and the screen panel 3 under the condition that the front panel and the screen panel are butted with each other by the frit 22. In this embodiment, there is provided a sealing jig, i.e., so-called annular holding member 41 for holding the butted state when it is fitted into the outer peripheries of the two panels 2, 3 under the condition that the front panel 2 and the screen panel 3 are butted with each other by the frit 22 As shown in FIG. 8, the annular holding member 41 includes an annular holding body 42 for substantially holding the panels 2, 3 formed of metal band-like materials. Resilient members whose respective ends are inwardly curved, in this embodiment, metal plate springs 43 and 44 are integrally attached to a side plate portion of the annular holding body 42 at its side facing to the front panel 2 and an opposing side plate portion of the annular holding body at its side facing to the screen panel 3. To the respective ends of the plate spring 43 at the side of the front panel 2, there are attached members 45 [45*a*, 45*b*] whose hardness is less than that of the front panel, so-called panel glass, preferably, which are softer than the panel glass, as will be described later on. Further, the annular holding member 41 further includes a load providing means, e.g., weight means 46. There are totally provided left and right and upper and lower four urging end portions which allow the plate springs 43 and 44 to be urged against the panels. Specifically, there are provided upper and lower two members 45*a*, 45*b* (four in total) of one plate spring 43 and upper and lower two members 44*a*, 44*b* (four in total) of the other plate spring 44.

The sealing apparatus 31 shown in FIG. 7 has the arrangement in which the back fixing plate 34 is disposed with an inclination in such a manner that a flat-type glass tube-assembly (combined assembly of the front panel 2, the screen panel 3 and the funnel 4) which is to be sealed by frits may be slightly inclined from the vertical state.

Figure 11:
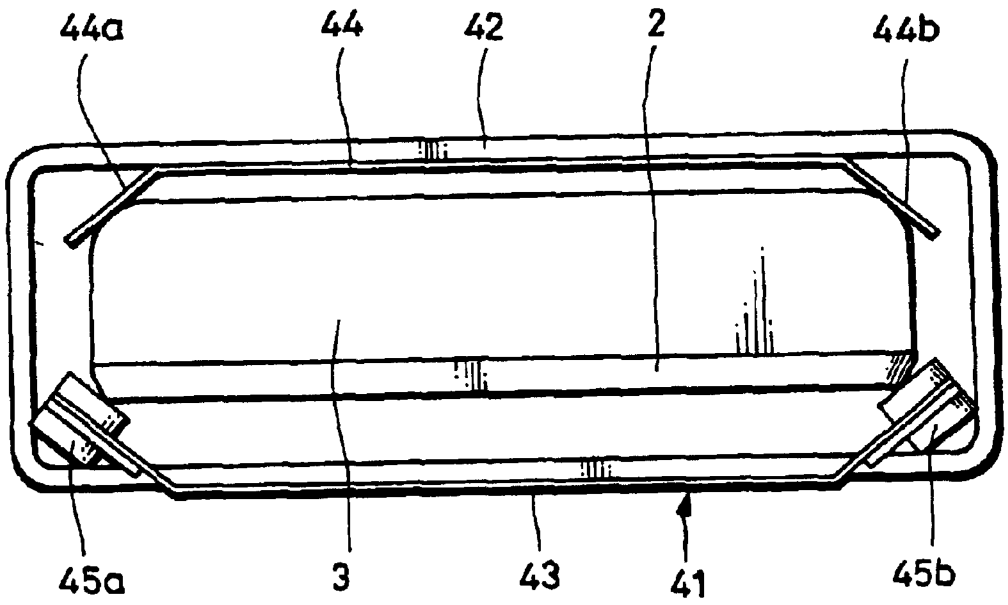
FIG. 11 is a top view showing the state in which both panels are held by the sealing jig shown in FIG. 8.

As shown in FIG. 11 one plate spring 43 allows the members 45*a*, 45*b* of its respective ends to press the respective edge portions of the front panel 2 with an elasticity, and the other plate spring 44 allows the members 44*a*, 44*b* of its respective ends to press the outer respective curved portions of the screen panel 3 with an elasticity. As a consequence, the two panels 2, 3 are urged against with each other and thereby combined together so as to have a predetermined positional relationship.

The weight means 46 includes a weight 47. Both ends of this weight 47 are supported by a pair of arms 48*a*, 48*b*. Hook portions 49*a*, 49*b* formed on the upper ends of the arms 48*a*, 48*b* are caught by projections 52*a*, 52*b* of arms 51*a*, 51*b* attached to the left and right side of the annular holding body 42.

Figure 9:
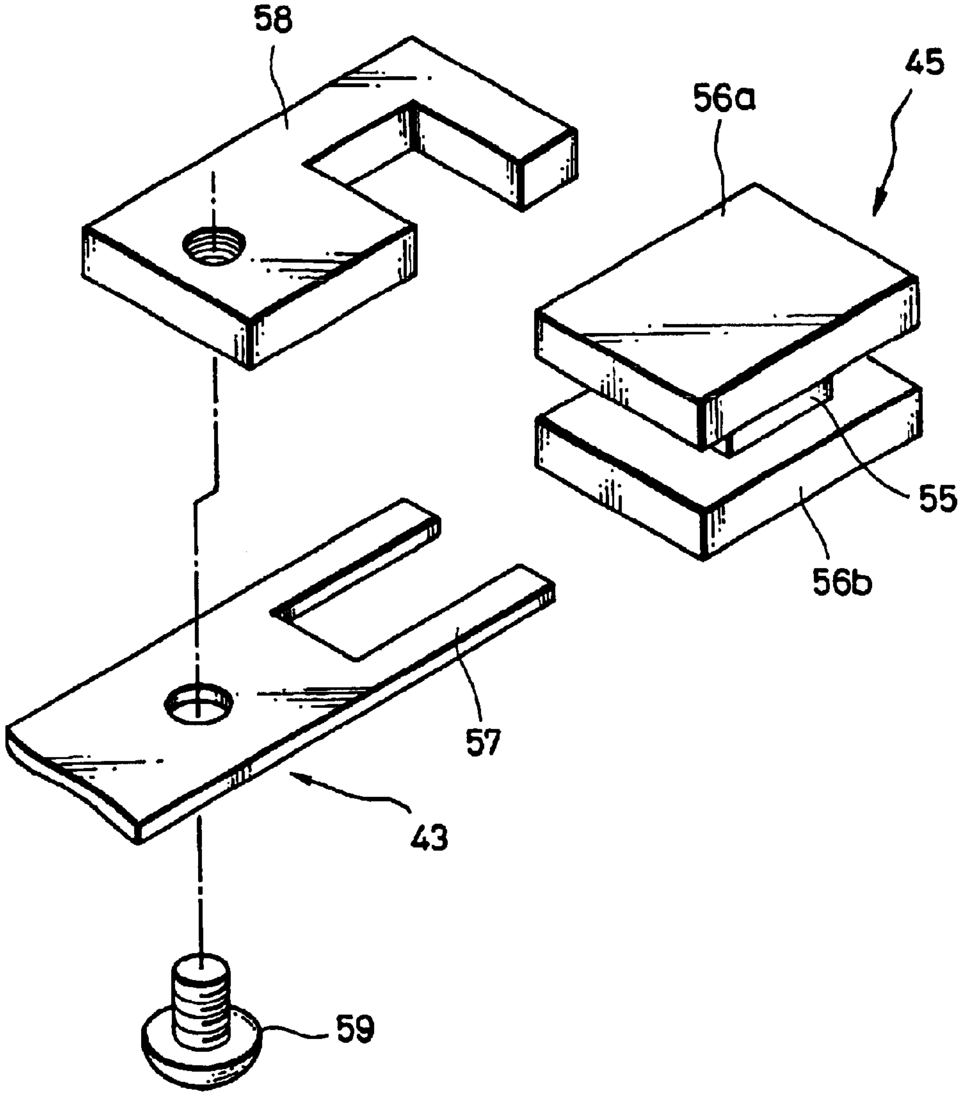
FIG. 9 is an exploded perspective view of a main portion of the sealing jig shown in FIG. 8.
Figure 10:
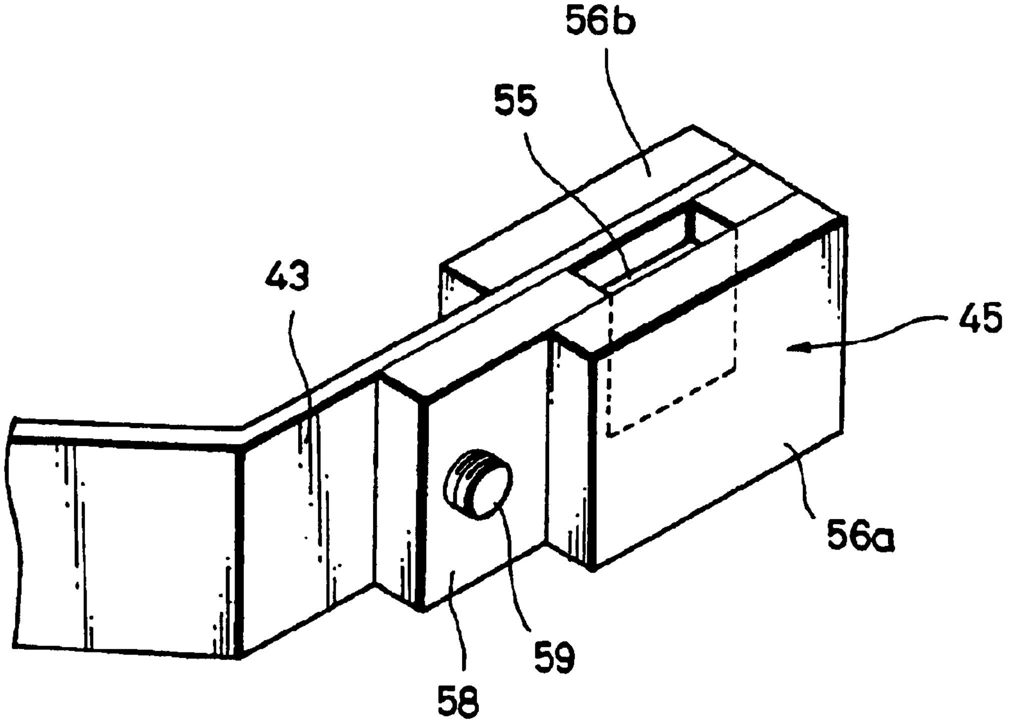
FIG. 10 is a perspective view showing the state in which the main portion of the sealing jig shown in FIG. 8 is being assembled.

The members 45 [45*a*, 45*b*] attached to both sides of the plate spring 43 should preferably be made of a material whose hardness ranges from about 1 to 5 in Mohs' hardness. The member 45 can be formed of a block member such as carbon, graphite, mica and alumina, in this embodiment, carbon block. The panel glass has a hardness ranging from 5 to 9 in Mohs' hardness (including tempered glass) As shown in FIGS. 9 and 10, this member 45 is formed as a shape comprising a central narrow portion 55 and upper and lower wide area portions 56 [56*a*, 56*b*] which sandwich the central narrow portion A U-like end portion 57 of the plate spring 43 is inserted into and engaged with the narrow portion 55 of the member 45. Further, A U-like presser piece 58 is inserted into and engaged with the narrow portion 55 from the direction perpendicular to the direction in which the plate spring end portion 57 is inserted, whereby the member 45 is fixed to the plate spring end portion 57. The presser piece 58 is fixed to the plate spring end portion 57 by a clamp screw 59. This presser piece 58 can prevent the member 45 from being disengaged from the plate spring end portion 57.

Figure 15:
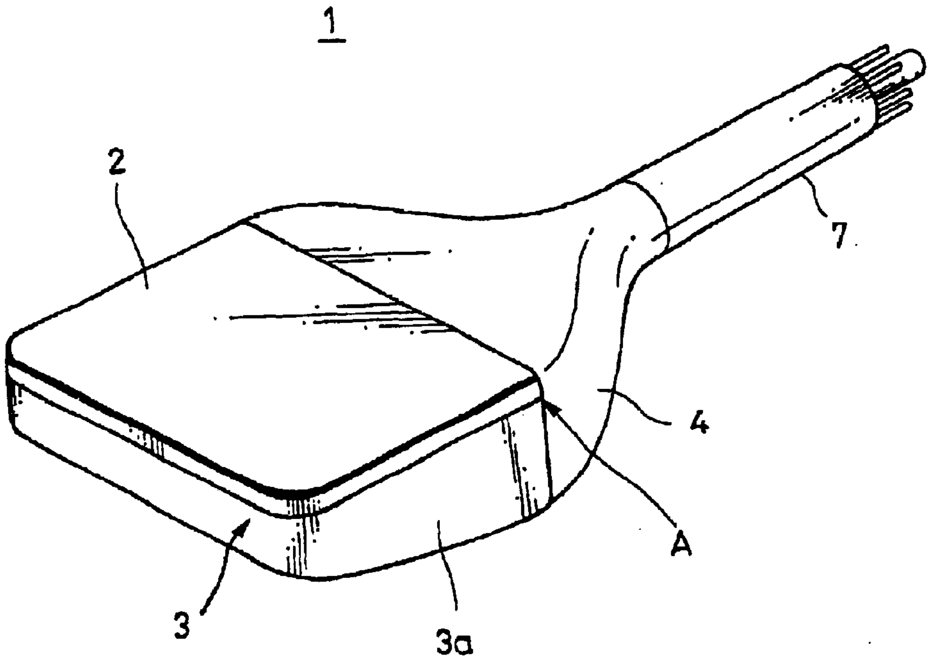
FIG. 15 is a perspective view of a flat-type cathode-ray tube which can be applied to the present invention.
Figure 16:
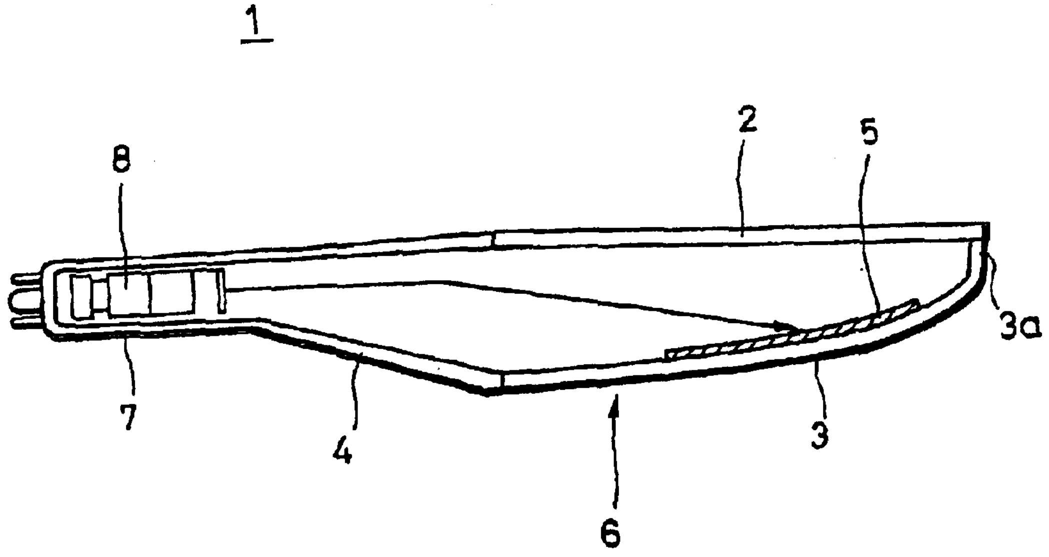
FIG. 16 is a cross-sectional view of the flat-type cathode-ray tube shown in FIG. 15.
Figure 17:
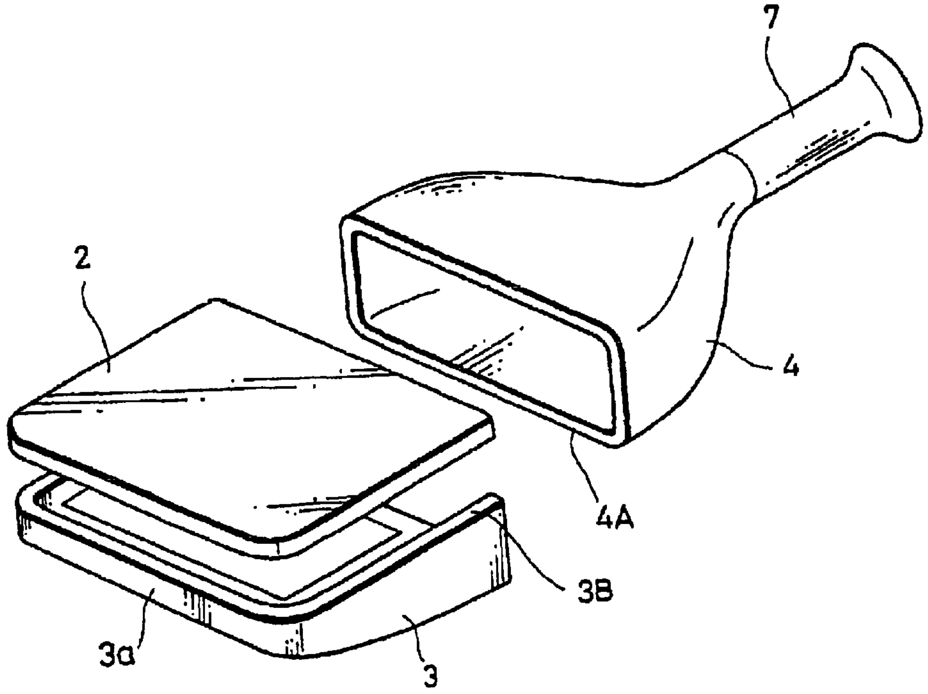
FIG. 17 is an exploded perspective view of a glass tube-assembly of the flat-type cathode-ray tube shown in FIG. 15.

According to the frit sealing method using the sealing apparatus 31 of this embodiment, the combined assembly in which the joint end faces of the front panel 2, the screen panel 3 and the funnel 4 are butted with one another by fritting is held on the frame 33 and thereby sealed in such a manner that its front panel 2 is inclined so as to butt with the butting means 36 of the frame 33, i.e., an angle between the front panel surface and the horizontal surface becomes an acute angle, whereby the front panel can satisfactorily be sealed by fritting. In general, since the air leakage tends to occur in the three-point joint portion A (see FIG. 15) at which the three points of the front panel 2, the screen panel 3 and the funnel 4 are collected from the outside, the front panel should be sealed further firmly by fritting. According to this embodiment, since the front panel 2 side is sealed by fritting under the condition that it is properly positioned in the lower oblique direction, when fused frits flow due to a gravitation, the fused frits are stored in the three-point joint portion A so that the front panel can be firmly sealed by fritting. Consequently, the air leakage in the three-point joint portion A can be prevented reliably.

In the sealing apparatus 31 according to this embodiment, the combined assembly of the front panel 2 and the screen panel 3 held in the state in which they are butted with each other by the engagement of the annular holding member 41, as shown in FIGS. 6 and 7, is placed on the funnel 4 which is attached to the back fixing plate 34 with its joint end face 4A directed in the upper direction in such a manner that the joint end faces of the combined assembly of the two panels 2 and 3 are butted with each other. In this case, if the butting means 36 is butted with the outer surface of the front panel 2 and the butting means 35 is butted with the outer surface of the funnel 4, then the combined assembly of the two panels 2 and 3 is set to a predetermined positional relationship relative to the funnel 4. The weight means 46 is suspended from the annular holding body 42. Since the weight 47 is butted with and suspended from the back fixing plate 34, the weight 47 can be prevented from being swung unnecessarily to apply downward force to the annular holding body 42, thereby making it possible to hold the combined assembly of the two panels 2 and 3 strongly.

Since the member 45 has a hardness equal to or less than that of the panel glass, erg., carbon block is softer than the panel glass, the front panel 2 can be protected from being damaged. Since the members 45 [45*a*, 45*b*] are attached to the respective ends of one plate spring 43 attached to the annular holding body 42 and the members 45 are used to press the edge portion of the front panel 2, when frits are sintered [e.g., 400° C. to 500° C.], the micro-crack produced when the annular holding body 42 is fitted into the chamfered front panel 2 can be prevented from further growing, accordingly, the front panel can be prevented from being destroyed. At the same time, frits can be sintered with safety.

In this connection, in the flat plate-like front panel 2, its edge portions are chamfered. If the plate springs 43, 44 are both formed of metal plate springs only, then when the front panel 2 and the screen panel 3 are held by directly urging the metal plate spring 43 against the edge portion of the chamfered front panel 2, scratches such as micro-cracks are generated in the above chamfered portion. When the front panel is sintered by fritting within the furnace, a stress occurs in the front panel 2 so that the above micro-crack grows to be a large crack, thereby resulting in the front panel being destroyed. However, according to this embodiment, such scratches can be prevented from being produced so that the front panel can be prevented from being destroyed. Simultaneously, frits can be sintered with safety.

With the use of the sealing apparatus 31 according to this embodiment, as compared with the case in which the front panel 2 and the screen panel 3 are joined by fritting and the two panels 2, 3 and the funnel 4 are joined by fritting separately, the handling and the sealing operations can be simplified considerably.

While the flat-type glass tube-assembly which is sealed by frits is held in such a manner that it is inclined as described above in the above embodiment, the present invention is not limited thereto, and the back fixing plate 34 may be disposed in the vertical or approximately in the vertical direction in such a manner that the flat-type glass tube-assembly may be held in the vertical direction or approximately in the vertical direction.

When the flat-type glass tube-assembly is sealed by frits in the vertical direction, the thickness of the frits can be made uniform over the whole of the glass-tube assembly so that a seal strength can be increased. In this connection, when the thickness of frits increases partly, a seal strength is decreased generally.

When the flat-type tube assembly is sealed by frits under the condition that it is being inclined, the front panel 2 and the funnel 4 can reliably be butted with the positioning butting means 36, 35 with the result that an assembly accuracy can be increased. In actual practice, the flat-type tube-assembly may be used under the condition that it is laid in the well-balanced inclined state.

According to the present invention, while the flat-type glass tube-assembly is sealed by frits under the condition that it may be disposed in the vertical direction or in the oblique direction, the present invention is not limited thereto, and the flat-type glass tube-assembly may be laid in the lateral direction (e.g., disposed in the horizontal direction).

While the annular holding body 42 is used as the holding means for holding the front panel 2 and the screen panel 3 in such a manner that they are butted with each other in the above embodiment, the present invention is not limited thereto, and any arrangement can be used as the holding means so long as it includes the aforementioned first and second resilient members to hold the front panel 2 and the screen panel 3 in such a manner that the front panel and the screen panel are butted with each other.

Figure 12:
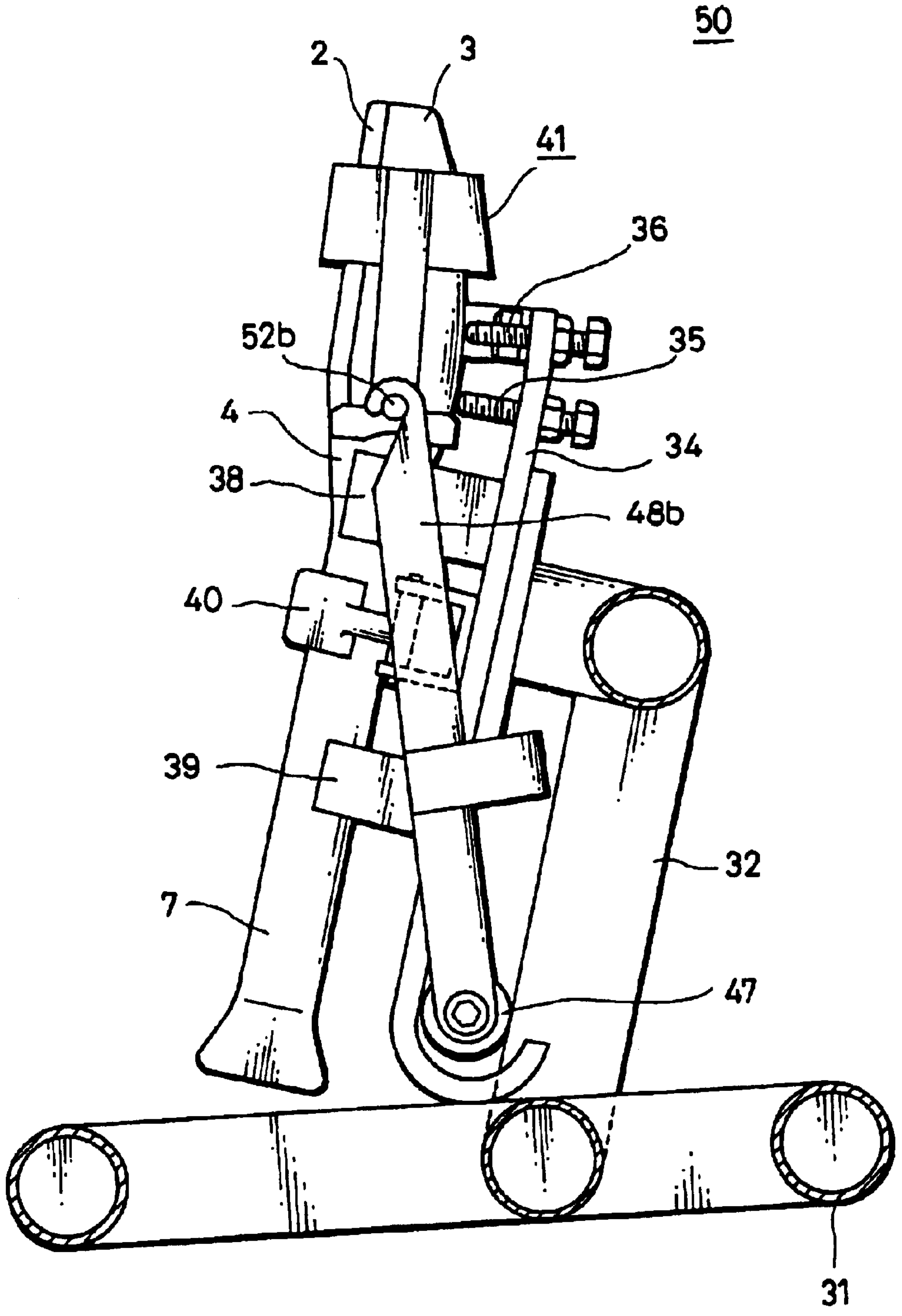
FIG. 12 is a perspective view showing an sealing apparatus according to another embodiment of the present invention.

FIG. 12 shows an sealing apparatus according to another embodiment of the present invention.

An sealing apparatus 50 according to this embodiment is constructed in such a manner that the combined assembly of the front panel 2, the screen panel 3 and the funnel 4 is attached to the back fixing plate 34 of the frame 33 such that the front panel 2 and the screen panel 3 are placed in the positional relationship opposite to the aforementioned positional relationship shown in FIG. 7. Specifically, the joint end face of the combined assembly of the two panels 2 and 3 is placed on the funnel 4 in such a manner that the above joint end face may be butted on the joint end face 4A of the funnel. At that time, the outer surface of the screen panel 3 is butted with the butting means 36, and the outer surface of the funnel 4 is butted with the butting means 45. The rest of the arrangement is similar to that of the aforementioned arrangement shown in FIG. 7 and therefore need not be described in detail.

Also in the sealing apparatus 50 according to this embodiment, the three of the front panel 2, the screen panel 3 and the funnel 4 can be sealed at the same time. Moreover, when frits are sintered, frits can be prevented from being cracked and the front panel 2 can be prevented from being damaged. Therefore, it becomes possible to sinter frits safely.

The front panel 2, the screen panel 3 and the funnel 4 can be held by using the sealing apparatus 30, 50 and the sealing jig according to this embodiment without being destroyed, and the handling and the sealing operations can be simplified considerably.

When the combined assembly of the front panel 2 and the screen panel 3 and the funnel 4 are joined together by frits, if they had not been joined together satisfactorily, there would occur an air leakage (so-called air leak) in which air flows from the outside of the glass tube assembly to the inside of the tube-assembly. The reason that this poor frit joint occurs is that, when the width of the joint end face of the funnel 4 is the same as that of the joint end face between the frit 2 and the screen panel 3 on the funnel side, fused frits are dropped down from the joint portion due to a positional displacement between the joint end faces with the result that the combined assembly of the front panel and the screen panel and the funnel cannot be joined together satisfactorily.

Figure 13:
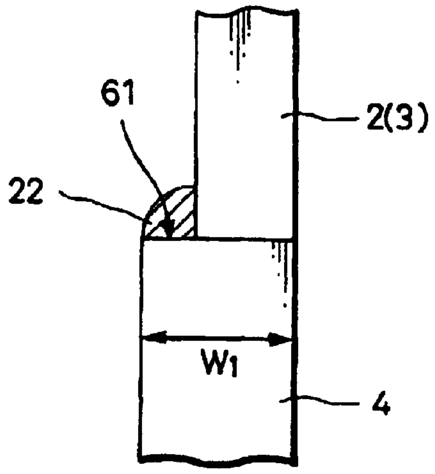
FIG. 13 is a cross-sectional view of a main portion showing an example of a portion in which an assembly body of a front panel and a screen panel and a funnel are joined together.
Figure 14:
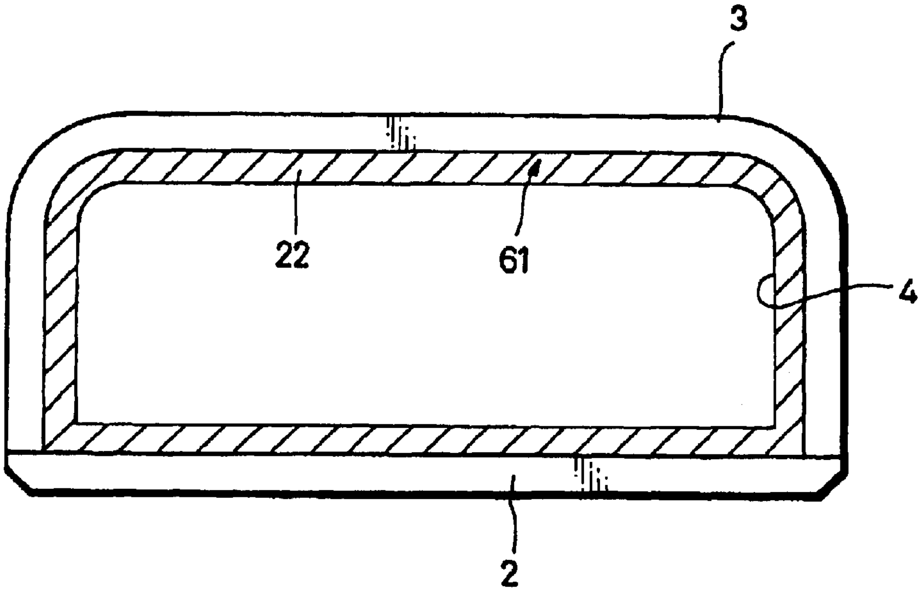
FIG. 14 is a perspective projection of a main portion showing an example of a portion in which an assembly body of a front panel and a screen panel and a funnel are joined together.

Therefore, according to this embodiment, as shown in FIGS. 13 and 14, in the joint surface between the combined assembly of the front panel 2 and the screen panel 3 and the funnel 4, the funnel 4 is inwardly projected from the screen panel 2 and the screen panel 3 thereby to form the frit reservoir shelf 61 over the whole of the inner periphery of the joint surface to fused frits. To be concrete, the width $W_1$ of the joint end face of the funnel 4 is set to be larger than the width $W_2$ of the joint end face between the frits 2 and the screen panel 3.

With the above arrangement, in the frit-sealing process, fused frits 22 are stored in a frit reservoir shelf 61 of the joint portion and can be prevented from being dropped to the lower direction. Under this condition, the frits are cooled and crystallized so as to cover the joint surface along the whole length of the inner periphery of the joint surface. As a result, air can be prevented from being leaked into the inside from the outside of the flat-type glass tube-assembly so that a highly-reliable frit-sealing can be carried out.

While the above frit coating method and the above frit coating apparatus 21 are applied to the process for coating the frits on the funnel 4 of the flat-type cathode-ray tube 1, they are not limited thereto, and can be applied to a process for coating frits on other objects to be coated.

While the present invention is applied to the frit sealing of the reflection-type or transmission type flat cathode-ray tube in which the fluorescent screen 5 is formed on the inner surface of the screen panel 3 in the above embodiment, the present invention is not limited thereto, and can be applied to the frit sealing of a transmission type flat cathode-ray tube in which the fluorescent screen 5 is formed on the inner surface of the front panel 4, for examples. In this case, the front panel 2 is served as the so-called screen panel.

According to the frit coating method of the present invention, the frits supplied from the frit supplying means are coated on the predetermined portion of the object to be coated by means of the roller-type coating means, whereby the frits can stably be coated on the object to be coated. Specifically, the frit can stably and uniformly be coated over the whole area including the corner portions of the joint end face of the funnel (without portions with which frits are not coated). As a result, the funnel and the two panels can be joined together completely by frits, and hence air leak can be prevented completely.

The frit supplying surface of the roller-type coating means is formed as the concave and convex surface, whereby the frits can stably be supplied to the frit supplying surface. Then, since the object to be coated is placed in the vicinity of the roller-type coating means to which frits had been supplied and the frits are coated on the surface of the object to be coated, the frits of the predetermined amount can stably be coated on the object to be coated.

Further, since the frits of the predetermined amount are supplied to the roller-type coating means under control, the amount of the supplied frits can accurately be regulated and the frits of the predetermined amount can reliably and uniformly be coated on the object to be coated.

According to the frit coating apparatus of the present invention, since the frits are coated on the object to be coated by the roller-type coating means, the frits can be coated on the object to be coated stably and satisfactorily.

Since the surface to which the frits are supplied from the roller-type coating means is formed as the concave and convex surface, the frits can stably be supplied to the frit supplying surface and the frits of the stable amount can be coated on the object to be coated.

Further, since the frit coating apparatus includes the supply amount control means for controlling the amount of the frits supplied to the roller-type coating means, the amount of the supplied frits can be regulated accurately, and hence the stable amount of the frits can be coated reliably and uniformly on the object to be coated.

As described above, according to the present invention, since the amount of the frits coated on the object to be coated can be made uniform, the coating process can be made efficient and the quality of the product can be stabilized.

In particular, the present invention is suitably applied to the process for sealing the glass tube-assembly of the flat-type cathode-ray tube by frits.

According to the sealing jig of the present invention, when the front panel, the screen panel and the funnel are sealed, the front panel and the screen panel can reliably be held without positional displacement. In addition, since the portion in which the first resilient member is urged against the outer surface of the front panel is comprised of the member whose hardness is selected to be less than that of the front panel, the front panel can be protected from being damaged. Moreover, when the glass tube-assembly is sintered by frits, the micro-crack produced when the holding means is attached to the chamfered front panel can be prevented from growing more, and hence the glass tube-assembly can be prevented from being broken. At the same time, the glass tube-assembly can be sintered by frits safely.

Since the annular holding body is provided with the load providing means, the annular holding body can reliably be fitted into the outer surfaces of the front panel and the screen panel so that the two panels can be held reliably.

According to the sealing apparatus of the present invention, the three of the front panel, the screen panel and the funnel can be sealed together. Moreover, since the sealing apparatus includes the above sealing jig, the front panel can be protected from being damaged. When the front panel is sintered, a crack can be prevented from being produced in the front panel. Hence, it becomes possible to sinter the front panel by frits safely.

By using the sealing apparatus and the sealing jig according to the present invention, the front panel, the screen panel and the funnel can respectively be held without being damaged, the handling and the sealing operations can be simplified considerably.

According to the sealing method of the present invention, since the combined assembly in which the joint end faces of the front panel, the screen panel and the funnel are butted with each other by frits is held and sealed under the condition that the angle between the plane of the front panel and the horizontal plane becomes the acute angle, the glass tube-assembly can satisfactorily be sealed by frits. Specifically, since the glass tube-assembly is sealed by frits under the condition that the front panel side is properly positioned in the lower oblique direction, when fused frits are caused to flow by a gravitation, such fused frits are stored in the three-point joint portion in which the front panel, the screen panel and the funnel are collected, and hence the glass tube-assembly can reliably be sealed by frits. Moreover, the air leakage at the three-point joint portion can be prevented reliably.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of frit coating at least a portion of an object, comprising the steps of:

providing an object have a portion to be coated;

rotating a roller-type coating means;

supplying frit from a fit supplying means to the roller-type coating means for coating said object;

coating at least said portion of said object by a roller-type coating means for coating said object; and regulating, through one of two plates, a frit amount supplied to the roller-type coating means based on a rotational direction of the roller-type coating means.

2. The method as set forth in claim 1, wherein the step of coating is further characterized in that said roller-type coating means includes a frit supply surface formed as a concave and convex surface.

3. The method as set forth in claim 2, wherein the step of supplying frit is further characterized by the step of supplying frit to said concave and convex surface.

4. The method as set forth in claim 3, wherein said object is a front panel of a flat-type glass tube-assembly having a joint end face of a skirt portion of said front panel, and further includes a step of providing a second object that is a screen panel having a joint end face, wherein the step of coating said frit includes a step of applying said frit to an end surface of at least one of said front panel and said screen panel, and further including a step of butting said end faces of said front panel with said frit on its end face and said screen panel.

5. The method as set forth in claim 4, further including a step of providing a funnel having a joint end face, coating said joint end face of said funnel with frit; and sealing said funnel with said from panel and said screen panel.

6. The method as set forth in any one of claims 1 to 5, further including a step of controlling an amount of frit supplied to the concave and convex surface of the coating means with a supply-amount control means so that frits of a predetermined amount may be uniformly coated on said object.

* * * * *

UNITED STATES PATENT AND TRADEMARK OFFICE

CERTIFICATE OF CORRECTION

PATENT NO. : 6,742,360 B2
APPLICATION NO. : 09/892668
DATED : June 1, 2004
INVENTOR(S) : Koichi Furui et al.

It is certified that error appears in the above-identified patent and that said Letters Patent is hereby corrected as shown below:

In the Claims:

Column 12
Line 40, "fit" should read -- frit --.

Column 13
Line 4, "from" should read -- front --.

Signed and Sealed this

Twelfth Day of February, 2008

JON W. DUDAS
*Director of the United States Patent and Trademark Office*